Nov. 7, 1939.    W. C. McMURRY    2,179,047
TRANSPORTATION EQUIPMENT
Filed Nov. 8, 1938    3 Sheets-Sheet 2

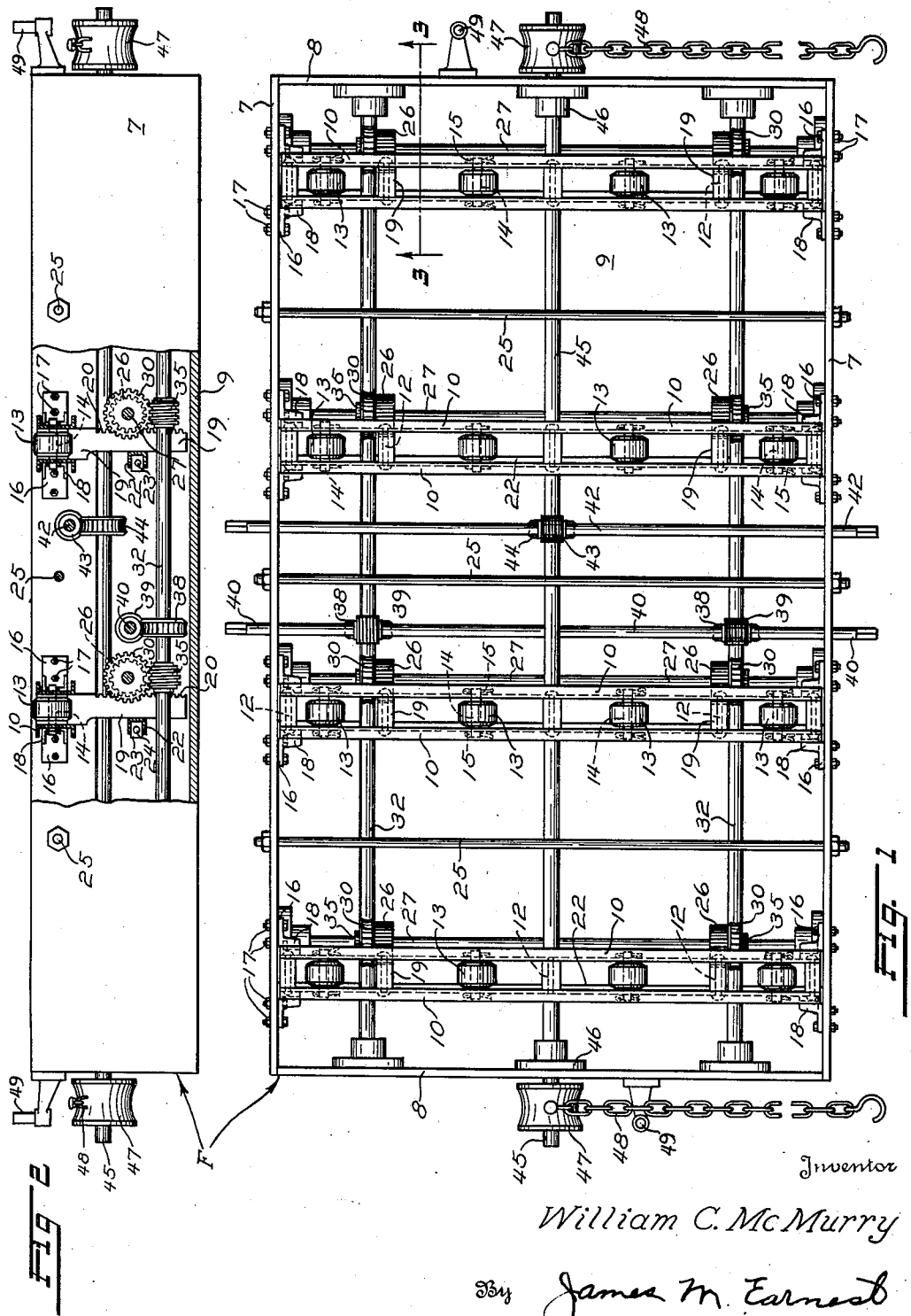

Inventor
William C. McMurry
By James M. Earnest
Attorney

Inventor
William C. McMurry
By James M. Earnest
Attorney

Patented Nov. 7, 1939

2,179,047

UNITED STATES PATENT OFFICE 2,179,047

TRANSPORTATION EQUIPMENT

William C. McMurry, Birmingham, Ala.

Application November 8, 1938, Serial No. 239,556

3 Claims. (Cl. 214—84)

The present invention relates to transportation equipment, and particularly to apparatus designed to facilitate the loading and unloading of freight cars, highway trucks and the like.

More specifically, this invention is especially concerned with the problem of avoiding excessive and overexpensive handling of articles of commerce while getting them into and out of transit. Heretofore it has been proposed to utilize removable freight car and van bodies for transporting goods from the initial point of shipment to the final destination. Such method of handling is particularly desirable when shipping by rail, to avoid numerous manual transfers of the goods from one vehicle to another. The chief drawback to incorporation of this method of handling in actual trade and industrial practices has resided in the lack of suitable apparatus for conveniently and satisfactorily mounting a loaded storage compartment upon the load-carrying framework of a railway car or a highway truck, and for thereafter removing said compartment therefrom.

The foregoing discussion is not intended to apply to storage boxes designed to pass through conventional freight car doors; but is restricted principally to compartments or load forming units, one or more of which is designed to form a weatherproof superstructure to cover the load-carrying upper surface of a railway or highway vehicle, which may be of either conventional or non-conventional design. It may be further pointed out that the words "load-forming units" are meant here to include any one or more substantially flat-bottomed devices designed to partake of translational movement over a set of rollers or equivalent guideways. Hereafter, any substantially antifrictional or friction-reducing support for translational movement of a load will be referred to as a "slideway."

The primary object of the present invention is to devise means and apparatus for solving the problems hereinbefore referred to and, particularly, to provide an economically desirable and practically suitable apparatus for loading and unloading the load-carrying frameworks of rail cars and highway trucks, over slideways, in a commercially satisfactory manner. Some of the factors contributing to the accomplishment of this object are set forth in the following subordinate objects.

It is an object of my invention to provide, in association with the load-carrying framework of a vehicle, a retractible slideway and mechanism for shifting the latter to and from a position in which it extends above the upper surface of said framework. Preferably, the slideway takes the form of a plurality of sets of simple rollers mounted on vertically retractible supports, with a common actuating mechanism for the several sets. In this connection it is a further object to provide means for fixing or limiting the extent of vertical movement of the rollers in one or both directions.

It is another important object of the present invention to so relate the framework and retracting mechanism that the latter is substantially fully housed and protected when the load is mounted upon the framework.

Another object resides in the provision of means in association with said framework for pulling the load-forming units over the slideway into position for transportation; and in this connection it is an object to house and conceal the actuating mechanism for the pulling means.

A further object consisting in providing novel and improved means that is readily operable to hold the load upon its supporting framework in transit.

The foregoing and other objects of my invention will clearly appear from a study of the following detailed description when taken in conjunction with the accompanying drawings and the appended claims. In the drawings:

Fig. 1 represents a top plan view of a preferred embodiment of the present invention;

Fig. 2 is a side elevational view, in partial section, of the apparatus of Fig. 1;

Figure 3:
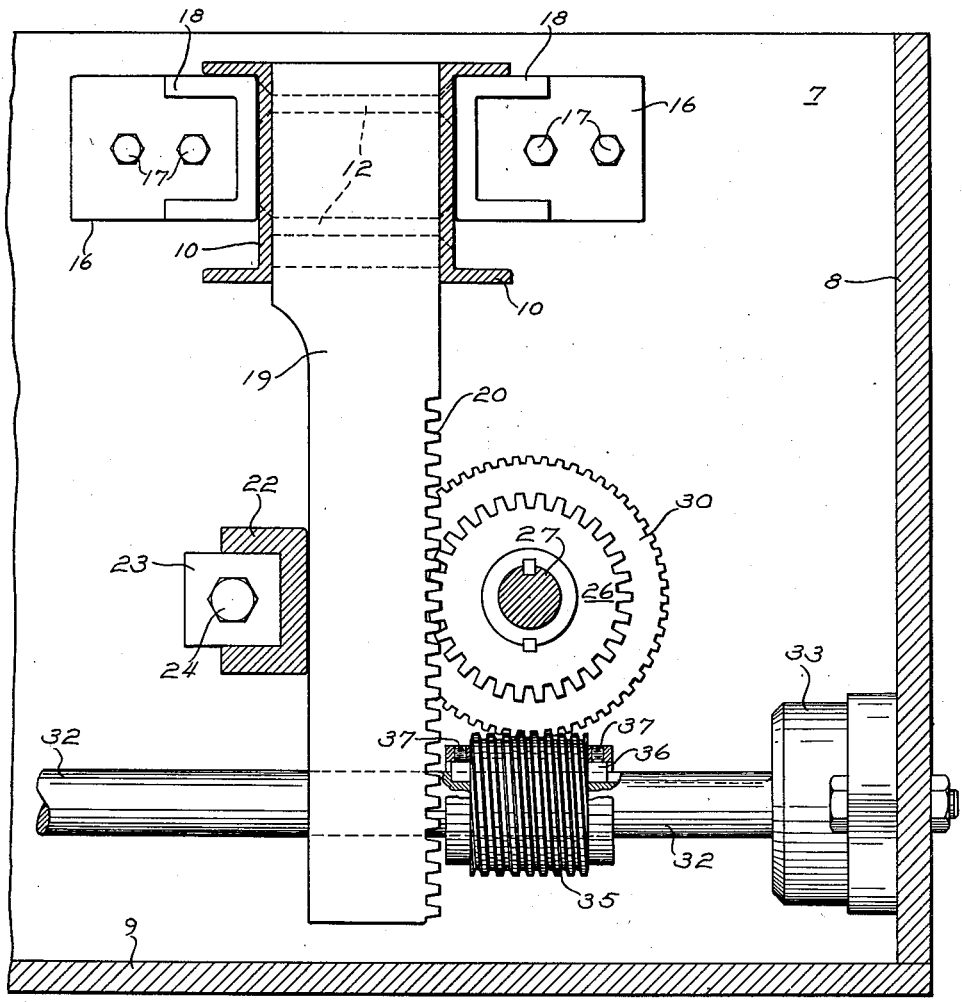
Fig. 3 is an enlarged detail view comprising a fragmentary section as seen when looking in the direction of the arrows towards the plane represented by line 3—3 in Fig. 1.

With continued reference to the drawings, wherein like characters are employed to designate like parts, and with particular reference for the moment to Figs. 1 and 2, a framework indicated generally at 8 is shaped and designed to be secured to a vehicle as a permanent part thereof to form a horizontal load-supporting platform. It may be mounted upon the usual chassis frame of a highway truck or above the wheels and axles of a railway flat-car, or it may be constructed as part of the original framework of the vehicle.

Preferably, it is of box-like formation, having side walls 7 and end walls 8; and, where the vehicle does not have a continuous upper surface to receive said walls 7 and 8, the framework will also include a bottom 9. The walls and bottom may be integrally or rigidly joined in any suitable manner, as for example, by welding at the meeting edges. As a large number of movable parts are contained within the framework it is desirable that when a load rests upon the upper edges of the walls 7 and 8, said parts will be housed and protected against the elements such as snow and ice and against the entrance of foreign matter such as dirt and cinders.

The planes of the walls 7 and 8 correspond, respectively, approximately with the sides and ends of the load-carrying rectangular plane of the vehicle. The load is placed upon the upper edges of the walls 7 and 8, preferably by sliding it laterally of the vehicle into position and thereafter clamping it to the framework. For example, if the framework F is part of a railway flat-car, the load in the form of a unit such as a filled compartment may be brought alongside the car by a highway truck (which also may be equipped with the apparatus of Figs. 1 and 2) and then slide laterally of and onto the framework F of the car. To facilitate this operation, the car (and preferably the truck also) will have its framework F equipped with the following mechanism.

Adjacent but just below the top plane of the framework F there are provided a plurality of pairs of transverse members 10, U-shaped in cross-section as shown. The two members of each pair are secured in properly spaced relation by rivets 12, and each pair carries several rollers 13. The latter are mounted on axial pins 14 which extend through the complemental members 10 for reception of fasteners such as cotter keys 15, the diameter of the rollers and the height of the pins being such that the upper parts of the rollers project materially above the top plane of the members 10.

Each rigidly joined pair of members 10 is floated and guided for limited vertical movement by two pairs of special brackets 16, said pairs of brackets being secured to the respective side walls 7 in any suitable manner, as by bolts 17. The brackets have U-shaped portions 18 that are sufficiently narrow, vertically, to permit a limited vertical movement of the members 10. The amount of vertical play is such that, when the members 10 are in their uppermost position the rollers 13 project slightly above the top plane of the framework F, and that when said members are in their lowermost position said rollers are entirely below said top plane. The object, of course, is to transfer a load anti-frictionally over elevated rollers, and thereafter to withdraw said rollers downwardly until the load is supported solely by the framework F. The pairs of members 10 are shifted vertically by the following mechanism.

Each pair of transverse members 10 carries two or more vertical rack bars 19, to the upper ends of which it is secured by some of the rivets 12 or other suitable means. The downwardly extending part of each bar is provided, at one edge, with a series of teeth 20; and at its other edge it is associated with a thrust-neutralizing or balancing member 22. Each member 22 extends from one side wall 7 to the other and is U-shaped and mounted at its ends upon short rectangular blocks 23 that are secured to said side walls by bolts 24. In view of the fact that the side walls 7 are relatively long and the members 10 and 22 are not directly secured thereto, several stay rods 25 preferably are provided to prevent spreading of said walls under load.

Figure 4:
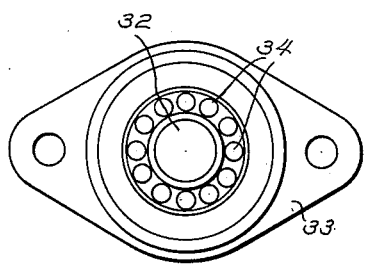
Fig. 4 is an end view of the wormshaft bearing seen in Fig. 3.
Figure 5:
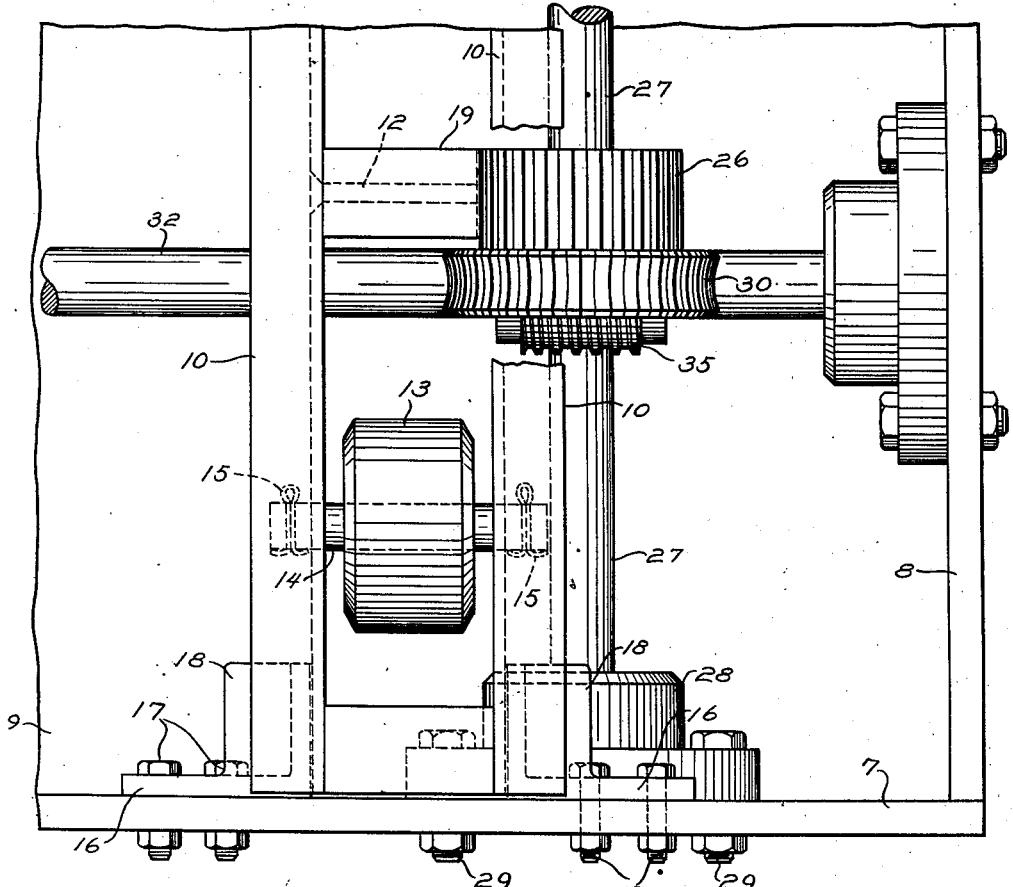
Fig. 5 is an enlarged fragmentary view as seen when looking downwardly upon the lower right-hand corner of Fig. 1.

Each rack bar 19 is in mesh with an individual gear 26, the latter being keyed in pairs to several actuating shafts 27 that extend transversely between the side walls 7. The ends of shafts 27 are journalled in bearing sockets 28 that are secured to the side walls 7 by bolts 29. Each shaft 27 also carries in keyed relationship as shown, a pair of worm wheels 30. It is through these worms that the shafts are actuated with a large torque multiplication, as follows:

A pair of shafts 32 extend between the frame end walls 8, in which they are journaled by bearing members 33 containing bearing elements 34 (see also Fig. 4). These bearings may be duplicates of the bearings 28. Each shaft 32 is disposed adjacent the bottoms of the worm wheels 30 and carries worms 35 in driving engagement with the latter. The worms 35 are secured to shafts 32 by keys 36 retained in place by set screws 37 (Fig. 3). The shafts 32 do not have power directly applied thereto but in turn are actuated (Figs. 1 and 2) through worm wheels 38 enmeshed with a pair of worms 39. The wheels 38 are keyed to the shafts 32, and the worms 39 are secured to a single actuating shaft 40. This shaft 40 extends transversely through both side walls 7 for reception at either side of the vehicle of a crank (not shown) to which manual power may be applied.

In the arrangement above described it will be perceived that the torque multiplication ratio is very high. If the shaft 40 is rotated to project the rollers 13 above the framework F, a very heavy load is unable to force the rollers downwardly. Likewise, if a heavy load is about to be removed from the vehicle, a relatively small torque, manually applied to the shaft 40, will lift said rollers and with them the heavy load, to permit convenient lateral removal of said load from the vehicle over the slideway afforded by the elevated rollers.

To afford mechanical assistance in pulling the load over the rollers into final position upon the framework F, I preferably provide a transverse shaft 42, which, like the shaft 40, may be actuated manually by a crank from either side of the vehicle. This shaft has secured thereto, internally of the framework, a worm 43 (Figs. 1 and 2); and the worm 43 is in mesh with a worm wheel 44. The wheel 44 is secured to a longitudinal shaft 45 that extends endwise through both end walls 8, bearings 46 being provided at said walls. The two projecting ends of the shaft 45 are secured axially within a pair of small drums or windlasses 47 that are connected to a pair of elongated flexible elements 48 which as shown, comprise chains but which may consist of any suitable equivalent. By hooking the free ends of the chains to the ends of a loaded compartment or similar load unit, the load unit may readily be drawn over the slideway (rollers 13) into proper position above the framework F by application, manually, of relatively small torque at either end of the shaft 42.

Figure 6:
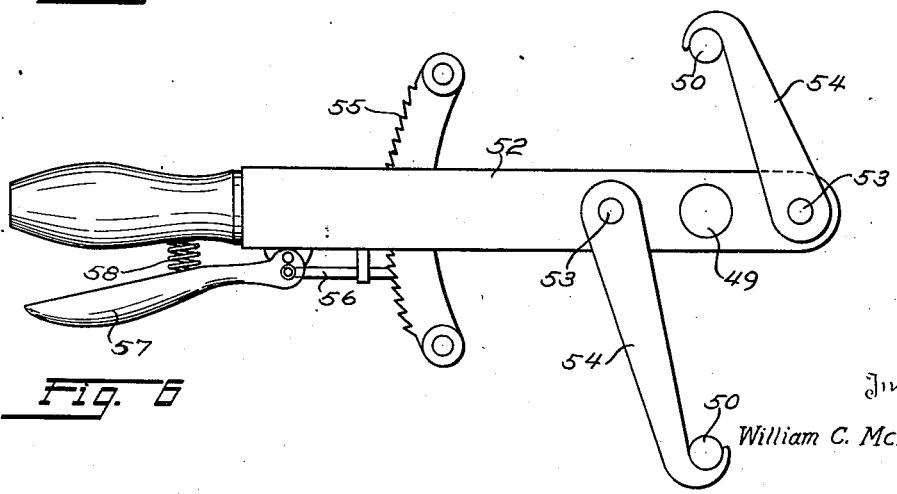
Fig. 6 is a detail view of a preferred form of clamping device for holding the load in position upon the structure shown in Figs. 1 to 5.

For use where the load constitutes a filled compartment of standardized design, I have devised a special clamping means for holding the loads against horizontal movement relative to the vehicle during transit. This clamping means is especially efficacious on railroad cars, in which there is relatively no tendency to joggle the load vertically. With reference to Figs. 1, 2, and 6, there is shown a quickly operable and sturdy clamping mechanism, comprising the following parts.

At least two points on the framework F are provided with brackets rigidly carrying vertical pins 49 that extend upwardly above the framework. The loaded compartment, in turn, will be equipped with a pair of pins 50 for complemental coaction with each pin 49. Upon each pin 49 there is pivotally mounted a lever 52 (Fig. 6)— this lever having, at opposite sides of the pin 49, pivotal connection as at 53, with a pair of links 54 that are hook-shaped at their free ends for cooperation with the pins 50. It will readily be perceived that, upon oscillation of the lever 52 in one direction the links 54 can be connected to the pins 50 to tend to force the latter towards each other; and that upon oscillation of said lever in the other direction, said links may be unhooked to release the load.

For the purpose of holding the lever 52 in its tightly clamped position, any conventional means such as the stationary frame-carried ratchet teeth 55, in cooperation with the pawl 56, may be supplied. In the illustration, the pawl 56 is connected to a pivoted arm 57 that is constantly urged outwardly from the lever 52 by a spring 58. A similar device may be used, on road vehicles, to secure the load against vertical movement. Also, the device may be used to securely interconnect two load units where the entire load for the framework F is formed of two or more sectional units arranged serially longitudinally of the vehicle.

The operation of my improved apparatus should be apparent from the foregoing description in its intertied relationship with explanations of the modes of operation of the component parts. Accordingly, the reader will not be burdened here with a résumé of the entire operation.

It should be understood that various alterations and modifications in the disclosed apparatus may be made within the scope of the present invention, without departing from the spirit thereof; and that therefore I wish to be limited, as is customary, only by such restrictions as necessarily must be construed as present in the appended claims to distinguish over the prior art.

What is claimed is:

1. Apparatus of the character described, comprising a framework designed to form a substantially horizontal load-supporting platform; friction-reducing means associated with said framework and designed to form a vertically adjustable slideway for transference of a load-forming unit horizontally into position above said framework; mechanism mounted on the framework and connected to said friction-reducing means to adjust the slideway vertically; and stop means, carried respectively by said framework and said slideway, for checking the ascent of the slideway when it projects slightly above the platform, and for checking the descent of the slideway when it has reached a position entirely below the upper surface of the platform, that portion of said stop means that limits descent being constructed and arranged to support the slideway in its lowermost position, said stop means comprising a plurality of channel-shaped members having spaced horizontal flanges forming part of said slideway, and complemental members secured to the framework between said flanges and having less vertical dimension than the spaces between the flanges, and said friction-reducing means comprising a multiplicity of anti-frictional elements carried by members arranged for vertical movement between said horizontal flanges.

2. Apparatus of the character described, comprising: a framework designed to form at its upper surface a substantially horizontal load-supporting platform; a plurality of parallel rows of vertical members capable of reciprocation relative to said framework; means carried by said framework to guide said members vertically; an elongated transverse element supported on the upper ends of each row of said members, the plurality of transverse elements forming a horizontal load transference slideway when elevated; and manually operable force-multiplying means common to all of said members and capable of simultaneously actuating them to elevate said slideway and any normal load carried thereby, the lower portions of said members having teeth, said force-multiplying means including gears in mesh with said teeth; a manually operable device for actuating said force-multiplying means; the force multiplication ratio between said manually operable device and said teeth being such as to facilitate vertical movement of the latter against heavy loads in response to manipulation of the former, and to prevent platform-carried loads from forcing said upright members downwardly at any time.

3. Apparatus of the character described, comprising: a framework designed to form at its upper surface a substantially horizontal load-supporting platform; a plurality of parallel rows of vertical members capable of reciprocation relative to said framework; means carried by said framework to guide said members vertically; an elongated transverse element supported on the upper ends of each row of said members, the plurality of transverse elements forming a horizontal load transference slideway when elevated; and manually operable force-multiplying means common to all of said members and capable of simultaneously actuating them to elevate said slideway and any normal load carried thereby, the lower portions of said members having teeth, said force-multiplying means comprising a plurality of gears individual to and engaged with the teeth of said members to transmit actuating forces thereto, a plurality of worm wheels secured to said gears for rotation therewith, a plurality of worms engaged with said worm wheels, and actuating means common to said plurality of worms.

WILLIAM C. McMURRY.